(12) United States Patent
Yukawa et al.

(10) Patent No.: US 7,144,593 B2
(45) Date of Patent: Dec. 5, 2006

(54) DEODORIZED COLORANT OF BRASSICACEAE PLANT

(75) Inventors: Chiyoki Yukawa, Toyonaka (JP); Takahito Ichi, Toyonaka (JP); Yasushi Shibahara, Toyonaka (JP); Kuniyuki Shinbo, Toyonaka (JP)

(73) Assignee: San-Ei Gen F.F.I., Inc, Toyonaka (JP)

( * ) Notice: Subject to any disclaimer, the term of this patent is extended or adjusted under 35 U.S.C. 154(b) by 170 days.

(21) Appl. No.: 10/276,320

(22) PCT Filed: Apr. 27, 2001

(86) PCT No.: PCT/JP01/03698

§ 371 (c)(1), (2), (4) Date: Nov. 25, 2002

(87) PCT Pub. No.: WO01/90254

PCT Pub. Date: Nov. 29, 2001

(65) Prior Publication Data

US 2003/0124235 A1    Jul. 3, 2003

(30) Foreign Application Priority Data

May 26, 2000  (JP)  ............................. 2000-157474

(51) Int. Cl.
*A23L 1/27* (2006.01)

(52) U.S. Cl. .................. 426/250; 426/262; 426/540; 426/425; 426/488; 426/489

(58) Field of Classification Search ................ 426/250, 426/262, 540, 425, 488, 489
See application file for complete search history.

(56) References Cited

U.S. PATENT DOCUMENTS

| | | | | |
|---|---|---|---|---|
| 3,963,700 A * | 6/1976 | Philip | .................. | 536/4.1 |
| 4,115,595 A * | 9/1978 | Jordan | .................. | 426/250 |
| 4,132,793 A * | 1/1979 | Haber et al. | .......... | 426/250 |
| 4,409,254 A | 10/1983 | Garin et al. | ......... | 426/540 |
| 6,180,154 B1 * | 1/2001 | Wrolstad et al. | ..... | 425/540 |
| 6,544,570 B1 * | 4/2003 | Sato et al. | .......... | 426/271 |
| 2003/0082281 A1 * | 5/2003 | Kohler et al. | ....... | 426/262 |

FOREIGN PATENT DOCUMENTS

| | | |
|---|---|---|
| DE | 32 29 345 A1 | 2/1984 |
| JP | 60-176562 A | 9/1985 |
| JP | 60-177076 A | 9/1985 |
| JP | 61-36364 A | 2/1986 |
| JP | 61-85166 | 4/1986 |
| JP | 61097361 * | 5/1986 |

(Continued)

OTHER PUBLICATIONS

Patent Abstracts of Japan 61085166 (Apr. 30, 1986).

(Continued)

*Primary Examiner*—N. Bhat
(74) *Attorney, Agent, or Firm*—Armstrong, Kratz, Quintos, Hanson & Brooks, LLP

(57) ABSTRACT

A colorant of a plant belonging to the family Brassicaceae which has no or significantly reduced smell originating in the Brassicaceae plant, a colorant formulation containing this colorant, and a process for producing the odorless or almost odorless colorant of the Brassicaceae plant. This colorant can be prepared by treating an adsorption-treated Brassicaceae plant colorant extract by at least one method selected from among adsorption, ion exchange, acid treatment, and membrane separation to thereby give an aroma component concentration of 100 ppm or less in case where the color value $E^{10\%}_{1\ cm}$ is 80.

15 Claims, 2 Drawing Sheets

FOREIGN PATENT DOCUMENTS

| | | | |
|---|---|---|---|
| JP | 61097362 | * | 5/1986 |
| JP | 61101560 | * | 5/1986 |
| JP | 4-154871 | * | 5/1992 |
| JP | 4-214767 A | | 8/1992 |
| JP | 9-255888 | | 9/1997 |
| JP | 10-36701 A | | 2/1998 |
| JP | 2000-290525 A | | 10/2000 |
| JP | 2001-275602 | * | 10/2001 |
| JP | 2001-294479 | * | 8/2002 |

OTHER PUBLICATIONS

Patent Abstracts of Japan 60177076 (Sep. 11, 1985) (Already of record).
Database WPI (XP002297678), CN 1241599A (Jan. 19, 2000).
Patent Abstracts of Japan 61101560 (May 20, 1986) (Already of record).
Database WPI (XP2297679), JP1986-165240.
Patent Abstracts of Japan 62181796 (Aug. 10, 1987).
A copy of the Chinese Patent Office Action for corresponding Chinese patent application No. 018101909 dated Jan. 7, 2005 with English translation.

* cited by examiner

A

B

US 7,144,593 B2

DEODORIZED COLORANT OF BRASSICACEAE PLANT

This application is a 371 application of PCT/JP01/03698 filed Apr. 27, 2001.

TECHNICAL FIELD

This invention relates to a colorant of Brassicaceae plant (Brassicaceae plant colorant) that is odorless or whose odor has been significantly reduced to just a faint odor, and to a colorant formulation containing this colorant. More particularly, the present invention relates to a Brassicaceae plant colorant that is odorless or has just a faint odor, in which the development of an unpleasant odor over time, which can be caused by light or heat during storage, is significantly diminished, and to a colorant formulation containing this colorant. The present invention also relates to a method for preparing this odorless or low-odor Brassicaceae plant colorant.

BACKGROUND ART

Brassicaceae plant colorants, which are anthocyanin colorants, are widely used, mainly in the coloring of beverages and other edible products. However, a Brassicaceae plant colorant has a distinctive vegetable or pickle odor that comes from its raw material, Brassicaceae plants, so when it is used in foods, cosmetics, and other such products, this odor can sometimes undesirably taint the flavor, taste and aroma of these products.

Consequently, there has long been a need for a Brassicaceae plant colorant formulation that can be added to foods and so forth and an aroma component therein has been reduced to the point that the distinctive odor of Brassicaceae plants is undetectable, and various purification methods have been examined up to now. Methods that have been proposed include a method in which an extract of red cabbage is treated with an adsorption resin or an ion exchange resin (Japanese Patent Examined Publication S62-18581), a method in which a water-soluble edible colorant is extracted with an organic solvent or supercritical carbon dioxide (Japanese Patent Examined Publication H4-48420), and a method in which a water or alcohol solution of an anthocyanin colorant is treated with a cation exchange resin, a silica gel (deodorization), an ultrafiltration membrane that removes molecules with a molecular weight of approximately 20,000 or higher, or the like (Japanese Patent Examined Publication H4-41185).

However, although colorant formulations containing a Brassicaceae plant colorant prepared by these treatments do indeed have less odor than a colorant formulation containing an untreated colorant, the fact remains that they still cannot be considered satisfactory colorant formulations.

Also, conventional Brassicaceae plant colorant formulations have been indicated as having a so-called "return smell," that is, the odor gradually becomes stronger over time as a result of heating or extended storage, and this problem of "return smell" has yet to be resolved with the various purification treatments discussed above.

DISCLOSURE OF THE INVENTION

It is an object of the present invention to provide a Brassicaceae plant colorant formulation that will have little adverse effect, over an extended period, on the flavor and taste of various products, such as foods, drugs, quasi drugs, and cosmetics, and that can be added without worry to these products.

More specifically, it is a first object of the present invention to provide a Brassicaceae plant colorant that has no odor originating in the aroma component contained in Brassicaceae plants, or in which this odor has been significantly reduced, and to provide a colorant formulation containing this colorant. It is a second object of the present invention to provide a Brassicaceae plant colorant with stability, undergoing little change over time such as so-called "return smell" as a result of heating or long-term storage, and to provide a colorant formulation containing this colorant. It is a third object of the present invention to provide a method for preparing an odorless or low-odor Brassicaceae plant colorant.

The inventors spent long hours investigating Brassicaceae plant colorant formulations in an effort to solve the problems encountered in the past, whereupon they discovered that the aroma component that is the source of pungent or unpleasant odor contained in Brassicaceae plants can be significantly removed and an odorless or low-odor Brassicaceae plant colorant can be prepared by the method of the present invention. They also found that a Brassicaceae plant colorant obtained in this manner will not have any "return smell" as a result of heating or extended storage. These discoveries confirmed that a Brassicaceae plant colorant formulation that is odorless or has only a faint odor and has stability over time can be prepared by using this Brassicaceae plant colorant as the component.

The present invention was perfected on the basis of these various findings.

Specifically, the present invention is the Brassicaceae plant colorant given by the following (1) to (7).

(1) A Brassicaceae plant colorant, in which the concentration of aroma component contained therein is no more than 100 ppm when the color value $E^{10\%}_{1\ cm}$ is 80.

(2) A Brassicaceae plant colorant, in which the concentration of aroma component contained therein is no more than 50 ppm when the color value $E^{10\%}_{1\ cm}$ is 80.

(3) A Brassicaceae plant colorant, in which the concentration of aroma component contained therein is no more than 20 ppm when the color value $E^{10\%}_{1\ cm}$ is 80.

(4) The Brassicaceae plant colorant according to (1), wherein the aroma component is at least one type selected from the group consisting of dimethyl disulfide, dimethyl trisulfide, 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid.

(5) A Brassicaceae plant colorant, wherein the total concentration of dimethyl disulfide and/or dimethyl trisulfide contained therein is no more than 0.1 ppm when the color value $E^{10\%}_{1cm}$ is 80.

(6) The Brassicaceae plant colorant according to (5), wherein the concentrations of 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid contained therein are each no more than 1 ppm when the color value $E^{10\%}_{1\ cm}$ is 80.

(7) The Brassicaceae plant colorant according to (1), wherein the colorant is at least one type selected from the group consisting of colorants originating in red cabbage, beet, radish, horseradish, black radish, red turnip, kale, broccoli, cauliflower, baby cabbage, kohlrabi, black mustard, ornamental kale, and leaf mustard.

The present invention is further a colorant formulation containing the Brassicaceae plant colorant according to any of (1) to (7). Examples of such aspects include the following (8) and (9).

(8) A Brassicaceae plant colorant formulation which is in the form of a solution.

(9) A Brassicaceae plant colorant formulation containing the Brassicaceae plant colorant in a proportion of 1 to 90 wt %.

The present invention also relates to a method for preparing the above-mentioned Brassicaceae plant colorant that has been highly purified, as given by the following (10) to (23).

(10) A method for preparing a Brassicaceae plant colorant that is odorless or has only a faint odor, wherein an adsorption-treated Brassicaceae plant colorant extract is subjected to at least one type of treatment selected from the group consisting of adsorption, ion exchange, acid treatment, and membrane separation.

(11) The method for preparing a Brassicaceae plant colorant according to (10), wherein the Brassicaceae plant colorant extract is obtained either by extracting while a Brassicaceae plant is finely sliced in an acidic extraction solvent, or by putting a finely sliced Brassicaceae plant in an acidic extraction solvent and extracting by soaking.

(12) The method for preparing a Brassicaceae plant colorant according to (11), wherein the pH of the acidic extraction solvent is from 1 to 4.

(13) The method for preparing a Brassicaceae plant colorant according to (11), wherein the Brassicaceae plant colorant extract is obtained by soaking a Brassicaceae plant in an acidic extraction solvent, and then performing a heating treatment.

(14) The method for preparing a Brassicaceae plant colorant according to (10), wherein the acid treatment involves the use of an acid used as a food additive.

(15) The method for preparing a Brassicaceae plant colorant according to (10), wherein the acid treatment involves the use of at least one type of inorganic acid selected from the group consisting of sulfuric acid, hydrochloric acid, phosphoric acid, and nitric acid.

(16) The method for preparing a Brassicaceae plant colorant according to (10), wherein the acid treatment essentially consists of exposing a Brassicaceae plant colorant extract that has undergone an adsorption treatment or any of various other treatments to a pH of 1 to 4.

(17) The method for preparing a Brassicaceae plant colorant according to (10), wherein the membrane separation is at least one type of membrane treatment selected from the group consisting of membrane filtering, ultrafiltration, reverse osmosis, electrolysis, ion selective membrane treatment, and ion exchange.

(18) A method for preparing a Brassicaceae plant colorant that is odorless or has only a faint odor, wherein an adsorption-treated Brassicaceae plant colorant extract is subjected to membrane separation after undergoing a deproteinization treatment.

(19) The method for preparing a Brassicaceae plant colorant according to (18), wherein the membrane separation treatment is at least one of treatment selected from reverse osmosis and ultrafiltration.

(20) The method for preparing a Brassicaceae plant colorant according to (18), wherein the membrane separation treatment makes use of a membrane whose molecular weight cut off is from 2000 to 4000.

(21) The method for preparing a Brassicaceae plant colorant according to (18), wherein the deproteinization is at least one type of treatment selected from the group consisting of ion exchange, extraction, membrane separation, and gel filtration.

(22) The method for preparing a Brassicaceae plant colorant according to (21), wherein the membrane separation performed as the deproteinization treatment makes use of a membrane whose molecular weight cut off is from $10^4$ to $10^6$.

(23) The method for preparing a Brassicaceae plant colorant according to (18), wherein an acid treatment is performed prior to the membrane separation.

BRIEF DESCRIPTION OF THE DRAWINGS

In FIG. 1B, ① is the peak for 4-pentenenitrile, ② is the peak for acetic acid, ③ is the peak for 5-(methylthio)pentanenitrile, and ④ is the peak for 3-phenylpropanenitrile. The peak at IS is for 2,6-di-tert-butyl-4-methylphenol (BHT), which was used as an internal standard substance. In the graphs, the vertical axis is the abundance, and the horizontal axis is the retention time.

In FIG. 2B, ① is the peak for hexanol, ② is the peak for cis-3-hexenal, ③ is the peak for acetic acid, and ④ is the peak for 4-vinylphenol. The peak at IS is for 2,6-di-tert-butyl-4-methylphenol (BHT), which was used as an internal standard substance. In the graphs, the vertical axis is the abundance, and the horizontal axis is the retention time.

BEST MODE FOR CARRYING OUT THE INVENTION

Figure 1:
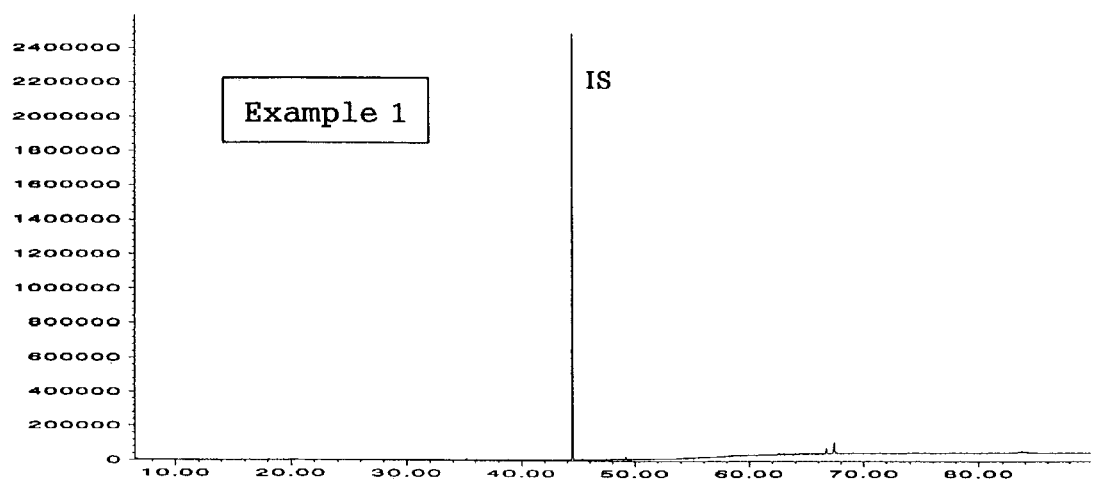
FIG. 1 is a graph of the results of measuring by gas chromatography-mass spectrometer (GC-MS) the amount of aroma component contained in the red cabbage colorant formulation prepared in Example 1 (FIG. 1A) and in the red cabbage colorant formulation prepared in Comparative Example 1 (FIG. 1B).
Figure 1:
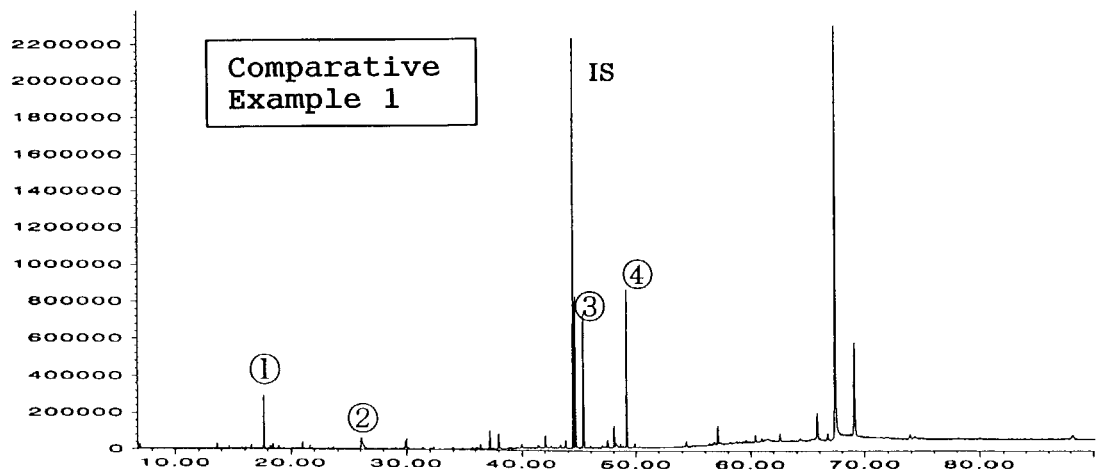

The present invention is an odorless or low-odor Brassicaceae plant colorant in which either there is none of the odor originating in the Brassicaceae plant used as a raw material, or this odor has been significantly reduced.

In the present invention, "Brassicaceae plant colorant" is broadly defined as a colorant obtained using a plant belonging to the Brassicaceae family as a raw material. Preferably, this is an anthocyanin colorant originating in a Brassicaceae plant, and this colorant encompasses red colorants and purple colorants containing said anthocyanin colorant.

There are no particular restrictions on the Brassicaceae plant here, but examples include red cabbage (*Brassica oleracea* L. var. *capitata* DC), broccoli (*Brassica oleracea* L. var. *itarica* Plen.), cauliflower (*Brassica oleracea* L. var. *otrytis* gr.), baby cabbage (*Brassica oleracea* L. var. *gemmifera* Zenher), kohlrabi (*Brassica oleracea* L. var. *caulorapa* DC), kale (*Brassica oleracea* L. var. *acephala* gr.), ornamental kale (*Brassica oleracea* L. var. *acephala* DC), red turnip (*Brassica rape*), black mustard (*Brassica nigra*), leaf mustard (*Brassica juncea*), and other such plants belonging to *Brassica rapa*; and beet (*Raphanus sativus* L.), radish (*Raphanus sativus* var. *radicula*), horseradish (*Raphanus sativus* var. *major*), black radish (*Raphanus sativus* var. *niger*), and other such plants belonging to *Raphanus sativus*.

"Color value" ($E^{10\%}_{1\ cm}$) as used in the present invention is a numerical value obtained by measuring the absorbency (measurement cell width: 1 cm) at the maximum absorption wavelength (near 530 nm) for the visible portion of a solution (buffer pH 3.0) containing the Brassicaceae plant colorant in question, and converting this absorbency into the absorbency of a solution containing 10 w/v % Brassicaceae plant colorant.

The term "aroma component" as used in the present invention means the aroma component contained in the various Brassicaceae plants, and particularly the aroma component that is the source of the pungent or unpleasant odor. There are no particular restrictions on this component, but specific examples include dimethyl disulfide, dimethyl trisulfide, 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid.

The Brassicaceae plant colorant of the present invention is characterized in that the total concentration of the above-mentioned aroma component contained in the colorant is no more than 100 ppm when the color value of the colorant is adjusted such that $E^{10\%}_{1\ cm}=80$. Preferably, this concentration is about 50 ppm or less, with about 20 ppm or less being better yet. The concentrations of the aroma component are substantially proportional to the clor values. Thus, as long as the total concentration of the aroma component in the Brassicaceae plant colorant of the present invention is within the above range when the color value has been adjusted as above, the colorant itself does not need to have the above-mentioned color value.

It is preferable if the Brassicaceae plant colorant of the present invention is such that the total concentration of dimethyl disulfide and/or dimethyl trisulfide contained in the colorant is about 0.1 ppm or less when the color value is adjusted to the above value. These components are volatile aroma components contained in Brassicaceae plants, have an extremely low odor threshold, give off an odor when contained in even a tiny amount, and therefore become a source of unpleasant odor in a Brassicaceae plant colorant. In this case, it is preferable if the concentrations of the various other aroma components mentioned above (3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid) that may be contained in the Brassicaceae plant colorant are each about 1 ppm or less.

The Brassicaceae plant colorant of the present invention that has been rendered odorless or had its odor reduced by this major reduction in the content of the aroma component can be prepared by subjecting an adsorption-treated Brassicaceae plant colorant extract to at least one type of treatment (in any combination desired) selected from the group consisting of adsorption, ion exchange, acid treatment, extraction, and membrane separation.

Therefore, the present invention provides a method for preparing the above-mentioned odorless or low-odor Brassicaceae plant colorant (deodorized Brassicaceae plant colorant). Looked at another way, this preparation method of the present invention can also be called a method for purification of Brassicaceae plant colorant that is useful in removing or reducing the amount of aroma components that cause a pungent or unpleasant odor, and particularly dimethyl disulfide, dimethyl trisulfide, 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid, contained in a Brassicaceae plant colorant extract. Viewed from yet another angle, the preparation method of the present invention can also be called a method for deodorizing a Brassicaceae plant colorant.

A solvent extract of one of the various Brassicaceae plants discussed above is used as the "Brassicaceae plant colorant extract" used in the preparation method of the present invention. The portion of the plant used in the extraction should be the portion containing the targeted colorant, and particularly anthocyanin colorant, with no particular distinction being made between the entire plant and a portion thereof (such as the roots, stems, leaves, fruit (seeds), petals, or buds). The callus of a Brassicaceae plant is also encompassed by the above-mentioned plants. All or part of this plant may be subjected to an extraction operation just as it is (raw) or after being crushed (coarsely powdered, finely chopped, etc.), or it may be subjected to an extraction operation after being dried and, if needed, crushed (powdered, etc.).

There are no particular restrictions on the solvent used in the above extraction, but an alcohol, water, or a mixture of these can be used favorably. Examples of alcohols include methanol, ethanol, propanol, isopropyl alcohol, butanol, and other $C_1$ to $C_4$ lower alcohols. Water or water containing an alcohol (hydrous alcohol) is preferred. If a hydrous alcohol is used, it is preferable for the alcohol content to be 40 vol % or less.

The solvent used for extraction can be an acidic solution, specifically an acidic solution adjusted to a pH of 1 to 4, and preferably from 1 to 3.

This acidic solution can be prepared by adding hydrochloric acid, sulfuric acid, nitric acid, phosphoric acid, or another inorganic acid, or citric acid, acetic acid, malic acid, lactic acid, or another organic acid to the extraction solvent. There are no particular restrictions on the amount in which the inorganic or organic acid is added, as long as the pH stays within the above range, but adjusting the amount to between 0.01 and 10 wt % is preferable.

Any commonly used extraction method can be employed, with no restrictions thereon, but examples include a method in which all or part of the Brassicaceae plant (as picked, or after being coarsely powdered or finely chopped), or a dried product thereof (including one produced by dry pulverization (such as a powder)) is cold dipped, hot dipped, or otherwise immersed in a solvent, a method in which extraction is performed under heating and stirring and an extract is obtained by filtration, and a percolation process.

A suitable extraction method is extraction under acidic conditions. This extraction under acidic conditions can be accomplished by using one of the above-mentioned acidic extraction solvents to perform one of the various extraction treatments mentioned above on all or part of the Brassicaceae plant (as picked, or after being coarsely powdered or finely chopped), or a dried product thereof (including one produced by dry pulverization (such as a powder)). Preferred examples include a method in which all or part of a Brassicaceae plant (raw or dried) is extracted while being finely sliced, and a method in which all or part of a Brassicaceae plant (raw or dried) is finely sliced, and then extracted by being soaked in an acidic extraction solvent. In this case, the extraction treatment can also be carried out using an acidic extraction solvent that has been heated to 100° C. or lower.

The preferred method is to finely slice all or part of a Brassicaceae plant (raw or dried), soak the pieces in an acidic extraction solvent with a pH of 1 to 4, and then perform a heating treatment at a temperature of 100° C. or lower.

The obtained extract is filtered, coprecipitated, or centrifuged as needed to remove the solids, after which this product is subjected to an adsorption treatment, either directly or after being concentrated.

The adsorption treatment can be performed by a standard method, such as adsorption using activated carbon, silica gel, or porous ceramic; or adsorption using a synthetic adsorption resin, such as styrene-based Duolite S-861 (trademark of Duolite, U.S.A., Diamond Shamrock; the same applies below), Duolite S-862, Duolite S-863, and Duolite S-866: aromatic Sepabeads SP70 (trademark of Mitsubishi Chemical; the same applies below), Sepabeads SP700, and Sepabeads SP825: Diaion HP10 (trademark of Mitsubishi Chemical; the same applies below), Diaion HP20, Diaion HP21, Diaion HP40, and Diaion HP50: or Amberlite XAD-4 (trademark of Organo; the same applies below), Amberlite XAD-7, and Amberlite XAD-2000.

The adsorption-treated extract used in the present invention can be obtained by using a hydrous alcohol or other suitable solvent to wash the resin carrier to which the Brassicaceae plant colorant extract has been applied and its colorant component adsorbed, and thereby recovers the desired extract. Water containing about 1 to 20 vol % ethanol can usually be used to advantage as the hydrous alcohol here.

The adsorption-treated Brassicaceae plant colorant extract thus obtained is then subjected to any of various treatments, such as another adsorption treatment, ion exchange, acid treatment, extraction, or membrane separation. Adsorption, ion exchange, acid treatment, or membrane separation is preferable.

Examples of adsorption treatments here are the same as those listed above.

There are no particular restrictions on the ion exchange treatment, which can be performed by a standard method using an ordinary ion exchange resin (cation exchange resin or anion exchange resin). For instance, examples of cation exchange resins include Diaion SK1B (trademark of Mitsubishi Chemical; the same applies below), Diaion SK102, Diaion SK116, Diaion PK208, Diaion WK10, and Diaion WK20, and examples of anion exchange resins include Diaion SA10A (trademark of Mitsubishi Chemical; the same applies below), Diaion SA12A, Diaion SA20A, Diaion PA306, Diaion WA10, and Diaion WA20, although other products may be used instead.

The "acid treatment" referred to in the present invention can be accomplished by exposing a Brassicaceae plant colorant extract that has undergone an adsorption treatment or any of various other treatments (such as adsorption, ion exchange, extraction, or membrane separation) to acidic conditions at a pH of 1 to 4, and preferably a pH of 1 to 3. The acid treatment can be performed easily by adding an acid to the above-mentioned treated extract. There are no particular restrictions on this acid, as long as it is one ordinarily used as a food additive, and any such acid can be selected as desired. Examples include citric acid, acetic acid, malic acid, lactic acid, and other organic acids, and sulfuric acid, hydrochloric acid, phosphoric acid, nitric acid, and other inorganic acids. Preferably, an inorganic acid normally used as a food additive will be used in the acid treatment.

There are no particular restrictions on the temperature at which the acid treatment is performed, and usually any temperature can be selected as needed from a range of 5 to 100° C. Examples include a range of 20 to 100° C. or 40 to 100° C. There are no particular restrictions on the duration of the acid treatment, either, which usually can be selected as needed from a range of 1 to 300 minutes. A short treatment time is generally sufficient if the treatment is carried out at a high temperature, and thus if the acid temperature is performed between 40 and 100° C., the treatment time can be from 5 to 60 minutes. The treated extract may or may not be stirred during this time.

There are no particular restrictions on the extraction treatment in the present invention, but an example is a method in which a Brassicaceae plant colorant extract that has undergone an adsorption treatment or any of various other treatments (such as adsorption, ion exchange, acid treatment, or membrane separation) is brought into contact with carbon dioxide gas or with a liquid such as ethylene or propane inside a sealed apparatus at a pressure and temperature over the critical point.

"Membrane separation" as used in the present invention encompasses a broad range of filtration by membrane, examples of which include filtration treatments that make use of a membrane filter (MF), ultrafiltration (UF) membrane, reverse osmosis membrane (NF), electrolysis membrane, or other such functional macromolecular membrane. In addition to ultrafiltration, reverse osmosis, and other such methods that utilize these membranes, known membrane separation methods include dialysis utilizing a concentration gradient produced by an ion selective membrane, and electrolysis in which an ion exchange membrane is used as a diaphragm and a voltage is applied thereto. For industrial purposes, a membrane separation method that makes use of a reverse osmosis membrane is preferable. The membrane material used in this membrane separation can be either natural, synthetic, or semi-synthetic, and examples include cellulose, cellulose diacetate or triacetate, polyamide, polysulfone, polystyrene, polyimide, and polyacrylonitrile.

The membrane separation method used in the present invention includes a method in which high-molecular weight compounds are separated out with a membrane whose molecular weight cut off is between $10^4$ and $10^6$, for example, and a method in which low-molecular weight compounds are separated out using a membrane with a molecular weight cut off of about 2000 to 4000, and preferably about 3000. Specific examples of the former method include ultrafiltration (UF) membrane treatments that make use of an NTU-3150 membrane, NTU-3250 membrane, NTU-3550 membrane, or NTU-3880 membrane (all made by Nitto Denko); Cefilt-UF (made by NGK Insulators); and an AHP-2013 membrane, AHP-3013 membrane, or AHP-1010 membrane (all made by Asahi Chemical). Specific examples of the latter method include reverse osmosis membrane (molecular weight cut off of about 3000) treatments that make use of an NTR-7250 membrane, NTR-7410 membrane, NTR-7430 membrane, or NTR-7450 membrane (all made by Nitto Denko); or an AIP-3013 membrane, ACP-3013 membrane, ACP-2013 membrane, AIP-2013 membrane, or AIO-1010 membrane (all made by Asahi Chemical).

These various treatments may be performed alone or in any combination of two or more. Also, the same treatment may be performed more than once, under the same or different conditions.

There are no particular restrictions on the preferred treatment method, but one example is a method in which an adsorption-treated Brassicaceae plant colorant extract is deproteinized, and this product is then subjected to membrane separation.

The deproteinization treatment can be performed most effectively by the above-mentioned extraction treatment, ion exchange treatment, or membrane separation treatment utilizing an ultrafiltration membrane or the like. Furthermore, a treatment that makes use of a membrane whose molecular weight cut off is approximately $10^4$ to $10^6$, as used in the separation and removal of the high-molecular weight compounds, can be favorably employed for the membrane separation treatment in this case. The deproteinization treatment, though, is not limited to these methods, and can be accomplished by gel filtration or any other standard deproteinization treatment.

If needed, another adsorption treatment can also be performed after the above-mentioned deproteinization treatment. An example of a favorable treatment method is to subject the colorant extract that has undergone deproteinization to an adsorption treatment as necessary, then perform an acid treatment, and finally subject the treated colorant extract thus obtained to membrane separation. The membrane separation treatment here is preferably reverse osmosis or ultrafiltration, with treatment by a reverse osmosis membrane being particularly favorable. This membrane separation is preferably performed using a membrane whose molecular weight cut off is 2000 to 4000, and preferably close to 3000.

The aroma component originating in the Brassicaceae plant, which is the source of the pungent or unpleasant odor, has been effectively removed from the Brassicaceae plant colorant of the present invention obtained as above, so the present invention provides a Brassicaceae plant colorant that is either odorless or has only a faint odor, with the odor having been reduced to the extent that the addition of the colorant to a foodstuff will have little adverse effect on the flavor thereof. Also, the Brassicaceae plant colorant of the present invention obtained by the above method undergoes little change over time, known as the "return smell," as a result of heating or long-term storage. The reason for this is believed to be that the precursor of the aroma component capable of giving off a pungent or unpleasant odor is decomposed or removed by the above preparation method of the present invention, although this theory has not been proven.

A colorant formulation can be prepared in the form of a solution by dissolving or dispersing (emulsifying) the Brassicaceae plant colorant of the present invention in water, an alcohol such as ethanol or propylene glycol, or another solvent, or in a dry form such as a powder, granules, tablets, or pills. A solution form is preferred.

Therefore, the present invention also provides a colorant formulation containing the above-mentioned Brassicaceae plant colorant.

This colorant formulation may be composed of just the Brassicaceae plant colorant of the present invention, or carriers and various additives that can be used in foods may also be contained in addition to the above-mentioned Brassicaceae plant colorant.

Specific examples of these carriers and additives include dextrin, lactose, and powdered syrup, as well as preservatives (such as sodium acetate and protamine), stabilizers (such as sodium phosphate and sodium metaphosphate), antioxidants (such as rutin and ascorbic acid), and other such food additives normally used with colorants and colorant formulations.

When the colorant formulation of the present invention contains any of various carriers, additives, and so forth, there are no particular restrictions on the proportion in which the above-mentioned Brassicaceae plant colorant is contained in the colorant formulation, but the amount is usually from 1 to 90 wt %, and preferably from 10 to 60 wt %.

The colorant formulation of the present invention is useful as a red or reddish-violet color in foods, drugs, quasi drugs, cosmetics, feed, and so forth, and particularly as a natural color.

There are no particular restrictions on the food to which the colorant formulation of the present invention can be applied, as long as it is dyed, or has coloring, but examples include ice cream, ice milk, lacto-ice, sherbet, ice candy, and other such frozen concoctions; milk beverages, lactobacillus beverages, fruit juice-containing soft drinks, carbonated beverages, fruit juice beverages, powdered beverages, and other such beverages; custard pudding, milk pudding, fruit juice-containing pudding, and other such puddings; jellies, Bavarian cream, yogurt, and other such desserts; chewing gum, bubble gum, and other such gums (stick gum and sugar-coated gum granules); marble chocolate and other such coated chocolates, as well as strawberry chocolate, blueberry chocolate, melon chocolate, and other flavored chocolates, and other such chocolates; hard candy (including bon bons, butterballs, and marbles), soft candy (including caramel, nougat, gummy candy, and marshmallow), drops, taffy, and other such candies; hard biscuits, cookies, okaki (sliced and dried glutinous rice), senbei (sliced and dried non-glutinous rice), and other such baked snacks; asazuke (fresh vegetables preserved with salt or malt), soy sauce pickles, salt pickles, miso pickles, kasuzuke (rice bran pickles), malt pickles, sugar pickles, vinegar pickles, mustard pickles, moromizuke (unrefined sake pickles), plum pickles, fukujinzuke (sliced vegetables pickled in soy sauce and dyed red), shibazuke (assorted vegetables hashed and pickled in salt), ginger pickles, kimchee, plum vinegar pickles, and other such pickles; vinaigrette dressings, non-oil dressings, ketchup, gravy, Worcester sauce, pork cutlet sauce, and other such sauces; strawberry jam, blueberry jam, marmalade, apple jam, apricot jam, preserves, and other such jams; red wine and other such fruit wines; candied cherries, apricots, apples, strawberries, and other such processed fruits; ham, sausage, roast pork, and other such processed meats; fish meat ham, fish meat sausage, ground fish meat, boiled fish paste, chikuwa (tubular fish cakes), hanpen (a cake of pounded fish), satsumaage (fried fish cakes), datemaki (rolled omelets), whale bacon, and other ground marine products; udon noodles, hiyamugi (cold soba noodles), soumen (vermicelli), soba (hot soba noodles), Chinese soba noodles, spaghetti, macaroni, bifun noodles, harusame noodles, won ton, and other such pastas; as well as various types of side dishes and processed food such as boiled fish paste, wheat gluten bread, and denbu (mashed and seasoned fish).

The coloring of foods and beverages encompasses not only artificial coloring by adding a colorant to a food or beverage, but also a wide range of coloring through the use of colorants already contained in the materials of the food or beverage, such as fruit juices.

In drugs, the present invention can be used, for example, as a color for various kinds of tablets, capsules, drinkable preparations, lozenges, gargles, and so forth; in quasi drugs, as a color for dentifrice, breath fresheners, mouthwashes, and so forth; in cosmetics, as a color for skin lotions, lipsticks, sun blocks, makeup, and so forth; and it can be used in feeds, such as cat food, dog food, fish food, and other such pet food, as aquaculture feed, and so forth.

The present invention encompasses the following aspects.
(a) A method for purification of a Brassicaceae plant colorant, characterized in that an adsorption-treated Brassicaceae plant colorant extract is subjected to at least one type of treatment selected from the group consisting of adsorption, ion exchange, pH adjustment, extraction, and membrane separation.

(b) A method for purification of a Brassicaceae plant colorant, characterized in that an adsorption-treated Brassicaceae plant colorant extract is subjected to membrane separation after undergoing a deproteinization treatment.

(c) The method for purification of a Brassicaceae plant colorant according to (b) above, wherein the deproteinization is at least one type of treatment selected from the group consisting of ion exchange, extraction, membrane separation, and gel filtration.

(d) The method for purification of a Brassicaceae plant colorant according to (b) above, wherein pH adjustment is performed prior to the membrane separation.

(e) A method for deodorizing a Brassicaceae plant colorant, characterized in that an adsorption-treated Brassicaceae plant colorant extract is subjected to at least one type of treatment selected from the group consisting of adsorption, ion exchange, pH adjustment, extraction, and membrane separation.

(f) A method for deodorizing a Brassicaceae plant colorant, characterized in that an adsorption-treated Brassicaceae plant colorant extract is subjected to membrane separation after undergoing a deproteinization treatment.

(g) The method for deodorizing a Brassicaceae plant colorant according to (e) above, wherein the deproteinization is at least one type of treatment selected from the group consisting of ion exchange, extraction, membrane separation, and gel filtration.

(h) The method for deodorizing a Brassicaceae plant colorant according to (e) above, wherein pH adjustment is performed prior to the membrane separation.

(i) An use of a Brassicaceae plant colorant as a food color, in which the concentration of aroma component contained therein is no more than 100 ppm when the color value $E^{10\%}_{1\,cm}$ is 80.

(j) An use of the Brassicaceae plant colorant as a food color according to (i) above, in which the aroma component is at least one type selected from the group consisting of dimethyl disulfide, dimethyl trisulfide, 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid.

(k) An use of a Brassicaceae plant colorant as a food color, in which the total concentration of dimethyl disulfide and/or dimethyl trisulfide contained therein is no more than 0.1 ppm when the color value $E^{10\%}_{1\,cm}$ is 80.

(l) An use of a Brassicaceae plant colorant as a food color, in which the total concentration of dimethyl disulfide and/or dimethyl trisulfide contained therein is no more than 0.1 ppm and the concentrations of 3-butenenitrile, 4-pentenenitrile, 3-phenylpropanenitrile, 4-(methylthio)butanenitrile, 5-(methylthio)pentanenitrile, hexanol, 2-hexenal, cis-3-hexenal, 4-vinylphenol, phenylacetaldehyde, and acetic acid contained therein are each no more than 1 ppm when the color value $E^{10\%}_{1\,cm}$ is 80.

EXAMPLES

The present invention will now be described in detail through examples and comparative examples, but the present invention is not limited in any way by these examples.

Comparative Example 1

10 kg of crushed fresh leaves of red cabbage (Brassicaceae plant) were put in 20 L of acidic water that had been adjusted to a pH of 2 with sulfuric acid, and this was allowed to stand overnight at room temperature to extract the colorant. A filtration auxiliary and diatomaceous earth were added to the colorant extract thus obtained, and suction filtration was performed, which yielded approximately 25 L of Brassicaceae plant colorant extract as the filtrate. The colorant component was adsorbed from this extract with Amberlite XAD-7 (trademark of Organo), a synthetic adsorption resin (amount of resin: 1.5 L, SV=1), and this resin was thoroughly washed with L of water, after which the red cabbage colorant was eluted out with a 60% ethanol aqueous solution, and this eluate was obtained as an adsorption-treated Brassicaceae plant colorant extract (5 L: a primary-purified colorant extract). This adsorption-treated extract was concentrated under reduced pressure to obtain 90 g of colorant extract whose color value $E^{10\%}_{1\,cm}$ was 200. 90 g of water and 45 g of ethanol were added to this 90 g of concentrated extract to prepare 225 g of a red cabbage colorant formulation whose color value $E^{10\%}_{1\,cm}$ was 80. When sniffed, this colorant formulation had the pungent odor characteristic of red cabbage.

Example 1

Brassicaceae Plant (Red Cabbage) Colorant Formulation (Solution)

4.8 L of a primary-purified colorant extract (adsorption-treated Brassicaceae plant colorant extract) obtained by the same method as in Comparative Example 1 was treated at 20° C. and 3.5 kg/cm² with an ultrafiltration membrane (AHP-2013 Membrane, trademark of Asahi Chemical; molecular weight cut off: 50,000) (membrane separation treatment). The treated extract thus obtained was then adjusted to a pH of 2.0 with sulfuric acid, the product of which was stirred for 30 minutes at a temperature of 40 to 80° C. (acid treatment). 5 L of water was then added to this acid-treated extract to perform a reverse osmosis membrane treatment (NTR-7250 Membrane, trademark of Nitto Denko, molecular weight cut off: about 3000), which gave 1 L of membrane-treated extract (membrane separation treatment). The aroma component and impurities in the red cabbage were removed as filtrate here, and the purified and deodorized colorant component was concentrated as the residue. This residue was concentrated under reduced pressure to obtain 80 g of concentrate that had been significantly deodorized and purified and had a color value $E^{10\%}_{1\,cm}$ of 200. 80 g of water and 40 g of ethanol were added to 80 g of this concentrate to prepare 200 g of a red cabbage colorant formulation whose color value $E^{10\%}_{1\,cm}$ was 80. This colorant was completely odorless.

Example 2

Brassicaceae Plant (Red Cabbage) Colorant Formulation (Solid)

60 g of water and 15 g of dextrin were added to 32 g of a colorant extract that had been significantly deodorized and purified and had a color value $E^{10\%}_{1\ cm}$ of 200, which had been prepared by the same method as in Example 1. This product was spray-dried to prepare 25 g of a red cabbage colorant powder formulation whose color value $E^{10\%}_{1\ cm}$ was 250. This colorant was odorless.

Example 3

GC-MS Measurement

The amounts of aroma components contained in the red cabbage colorant formulation manufactured in Comparative Example 1 (comparative product) and the red cabbage colorant formulation manufactured in Example 1 (present invention product) were compared with a gas chromatography-mass spectrometer (GC-MS). Specifically, 10 g of each colorant (color value $E^{10\%}_{1\ cm}$=80) was extracted with 200 mL of diethyl ether containing 3 ppm an internal standard substance (IS: 2,6-di-tert-butyl-4-methylphenol (BHT)). This diethyl ether solution was then dried by evaporation, and the concentrate thus obtained was put in a gas chromatography-mass spectrometer (GC-MS) to measure the amount of aroma component.

| GC-MS measurement conditions | |
|---|---|
| GC/MS | Hewlett-Packard 5973 Mass Selective Detector |
| Column | DB-WAX made by J&W (0.25 mm × 60 m) |
| Temperature | inlet 250° C., interface 230° C. |
| | column temperature 50° C. (2 min.) −220° C., elevation rate 3° C./min. |
| Split ratio | 70:1 |
| Ionization electrode | 70 eV |

The results are shown in FIG. 1. As indicated in FIG. 1A, the total ion chromatogram of the red cabbage colorant formulation of Example 1 (present invention product) indicated that the aroma components other than the internal standard substance accounted for only a tiny amount (5 ppm or less). In contrast, as shown in FIG. 1B, many volatile aroma components were found to be contained (approximately 320 ppm) in the red cabbage colorant formulation of Comparative Example 1 (comparative product). These results were in agreement with the above-mentioned fact that the colorant formulation of Comparative Example 1 had a strong smell of vegetables or pickles, characteristic of red cabbage, whereas the colorant formulation of Example 1 was odorless.

In FIG. 1B, ① is the peak for 4-pentenenitrile, ② is the peak for acetic acid, ③ is the peak for 5-(methylthio) pentanenitrile, ④ is the peak for 3-phenylpropanenitrile, and IS is the peak for BHT, which was used as the internal standard substance.

Example 4

Flavor Evaluation and Storage Test

The red cabbage colorant formulation of Comparative Example 1 (comparative product) and the red cabbage colorant formulation of Example 1 (present invention product) were evaluated for their flavor immediately after manufacture, and their flavor after storage for between 15 and 30 days at 5° C., 25° C., or 38° C., by a panel of ten well-trained flavorists. Also, a beverage-type solution (color value $E^{10\%}_{1\ cm}$=0.04, Brix. 10°, 0.2% citric acid aqueous solution, no flavoring added) was prepared using each of the colorant formulations, and the flavor of each solution immediately after preparation and after storage were comparatively evaluated in the same manner as above, the results of which are given in Table 1.

TABLE 1

| | | | Immediately after preparation | After being stored 15 days | After being stored 30 days |
|---|---|---|---|---|---|
| C.E. 1 | Formulation | 5° C. | C | C | D |
| | | 25° C. | C | D | E |
| | | 38° C. | C | E | E |
| | Beverage | 5° C. | B | B | B |
| | | 25° C. | B | C | C |
| | | 38° C. | B | D | D |
| Ex. 1 | Formulation | 5° C. | A | A | A |
| | | 25° C. | A | A | A |
| | | 38° C. | A | A | A |
| | Beverage | 5° C. | A | A | A |
| | | 25° C. | A | A | A |
| | | 38° C. | A | A | A |

[C.E.: Comparative Example]
Evaluation criteria:
A: no odor perceived whatsoever
B: very slight odor
C: has odor
D: strong odor
E: extremely strong odor As can be seen from the results for immediately after preparation in Table 1, the odor of the product of the present invention was significantly reduced as compared to that of the comparative product, and the former was deemed to be a substantially odorless colorant. Furthermore, the flavor of the comparative product grew steadily stronger as the storage duration lengthened from 15 to 30 days, whereas the present invention product underwent little change over time, and remained in the same odorless state as immediately after its preparation. This suggests not only that the Brassicaceae plant colorant (red cabbage colorant) of the present invention, manufactured by the method in Example 1, does not itself contain any aroma components that give off an odor, or contains almost none, but also that no impurities that would be precursors of these aroma components are contained, either.

Example 5

10 kg of pulverized beet (Brassicaceae plant) was put in 20 L of acidic water that had been adjusted to a pH of 2 with sulfuric acid, and this was allowed to stand overnight at room temperature, and the heated at 40° C. A filtration auxiliary and diatomaceous earth were added to the colorant extract thus obtained, and suction filtration was performed, which yielded approximately 25 L of Brassicaceae plant colorant extract as the filtrate. The colorant component was adsorbed from this extract with Amberlite XAD-7 (trademark of Organo), a synthetic adsorption resin (amount of resin: 1.5 L, SV=1), and this resin was thoroughly washed with 5 L of water, after which the beet colorant was eluted out with a 60% ethanol aqueous solution, and this eluate was obtained as an adsorption-treated Brassicaceae plant colorant extract (5 L: a primary-purified colorant extract).

5L of this primary-purified colorant extract (adsorption-treated Brassicaceae plant colorant extract) was treated in the same manner as in Example 1 to obtain 80 g of colorant extract whose color value $E^{10\%}_{1\ cm}$ was 200. 80 g of water and 40 g of ethanol were added to this 80 g of concentrated extract to prepare 200 g of a beet colorant formulation whose color value $E^{10\%}_{1\,cm}$ was 80. This colorant formulation was completely odorless.

Example 6

GC-MS Measurement

The amount of aroma component contained in the beet colorant formulation prepared in Example 5 (present invention product) was measured with a gas chromatography-mass spectrometer (GC-MS) in the same manner as in Example 3. For the sake of comparison, the amount of aroma components contained in a conventional beet colorant formulation was similarly measured.

Figure 2:
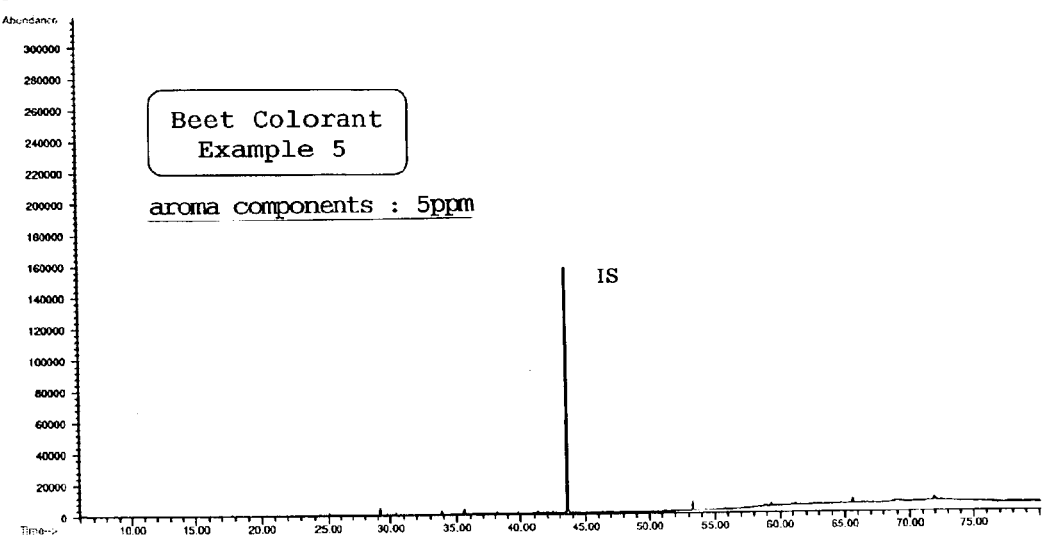
FIG. 2 is a graph of the results of measuring by gas chromatography-mass spectrometer (GC-MS) the amount of aroma component contained in the beet colorant formulation prepared in Example 4 (FIG. 2A) and in a conventional beet colorant formulation (FIG. 2B).
Figure 2:
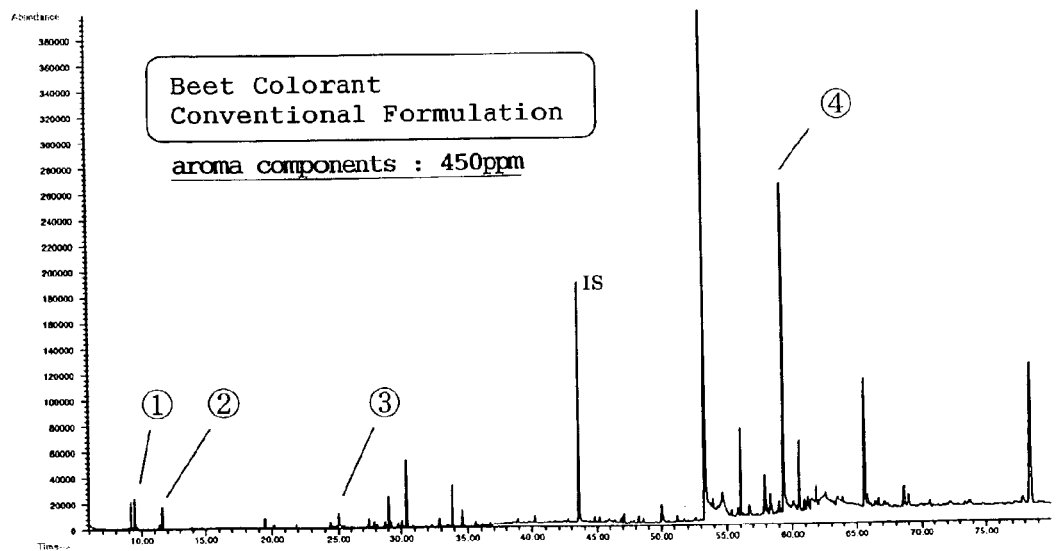

The results are shown in FIG. 2. As indicated in FIG. 2A, the total ion chromatogram of the beet colorant formulation prepared in Example 5 (present invention product) revealed the component other than the internal standard substance to be a tiny amount (5 ppm or less). In contrast, as shown in FIG. 2B, many volatile aroma components were found to be contained (approximately 450 ppm) in the conventional beet colorant formulation. These results were in agreement with the above-mentioned fact that the conventional beet colorant formulation had a strong smell of vegetables or pickles characteristic of beet, whereas the colorant formulation of Example 5 was odorless. In FIG. 2B, ① is the peak for hexanol, ② is the peak for cis-3-hexenal, ③ is the peak for acetic acid, ④ is the peak for 4-vinylphenol, and IS is the peak for BHT, which was used as the internal standard substance.

INDUSTRIAL APPLICABILITY

The Brassicaceae plant colorant of the present invention is highly purified, and as a result, either has none of the unpleasant or pungent odor that comes from the aroma components contained in the Brassicaceae plant used as a raw material, or has had this odor significantly reduced to the point of being an odorless or low-odor colorant. Furthermore, the change over time such as return smell in the Brassicaceae plant colorant caused by heating or long-term storage is significantly reduced. Accordingly, when the colorant of the present invention, or a colorant formulation containing said colorant, is used to color a beverage or other foodstuff, a drug, a quasi drug, a cosmetic, feed, or the like, the product will be unaffected by the smell of the aroma components characteristic of a Brassicaceae plant colorant, allowing a product with a better flavor to be manufactured.

The invention claimed is:

1. A method for preparing a deodorized Brassicaceae plant colorant, comprising:
    subjecting an adsorption-treated Brassicaceae plant colorant extract to a combination of an acid treatment at a temperature in the range of 80° C. to 100° C. to produce an acid treated extract;
    optionally subjecting said acid treated extract to one or more of adsorption and ion exchange, and
    subjecting said extract to membrane separation.

2. The method for preparing a deodorized Brassicaceae plant colorant according to claim 1, wherein the Brassicaceae plant colorant extract is obtained either by extracting while a Brassicaceae plant is finely sliced in an acidic extraction solvent, or by putting a finely sliced Brassicaceae plant in an acidic extraction solvent and extracting by soaking.

3. The method for preparing a deodorized Brassicaceae plant colorant according to claim 2, wherein the pH of the acidic extraction solvent is from 1 to 4.

4. The method for preparing a deodorized Brassicaceae plant colorant according to claim 2, wherein the Brassicaceae plant colorant extract is obtained by soaking a Brassicaceae plant in an acidic extraction solvent, and then performing a heating treatment.

5. The method for preparing a deodorized Brassicaceae plant colorant according to claim 1, wherein the acid treatment involves the use of an acid used as a food additive.

6. The method for preparing a deodorized Brassicaceae plant colorant according to claim 1, wherein the acid treatment involves the use of at least one inorganic acid selected from the group consisting of sulfuric acid, hydrochloric acid, phosphoric acid, and nitric acid.

7. The method for preparing a deodorized Brassicaceae plant colorant according to claim 1, wherein the acid treatment essentially consists of exposing a Brassicaceae plant colorant extract that has undergone an adsorption treatment or any of various other treatments to a pH of 1 to 4.

8. The method for preparing a deodorized Brassicaceae plant colorant according to claim 1, wherein the membrane separation is at least one treatment selected from the group consisting of membrane filtering, ultrafiltration, reverse osmosis, electrolysis, ion selective membrane treatment, and ion exchange.

9. A method for preparing a deodorized Brassicaceae plant colorant, comprising:
    optionally further adsorbing an adsorption-treated Brassicaceae plant colorant extract to produce an optionally adsorbed colorant;
    deproteinizing said optionally adsorbed colorant to produce a deproteinized colorant;
    acid treating said deproteinized colorant at a temperature in the range of 80° C. to 100° C. to produce an acid treated colorant; and
    subjecting said acid treated colorant to membrane separation.

10. The method for preparing a deodorized Brassicaceae plant colorant according to claim 9, wherein the membrane separation is at least one treatment selected from reverse osmosis and ultrafiltration.

11. The method for preparing a deodorized Brassicaceae plant colorant according to claim 9, wherein the membrane separation makes use of a membrane whose molecular weight cut off is from 2000 to 4000.

12. The method for preparing a deodorized Brassicaceae plant colorant according to claim 9, wherein the deproteinization treatment is at least one treatment selected from the group consisting of ion exchange, extraction, membrane separation, and gel filtration.

13. The method for preparing a deodorized Brassicaceae plant colorant according to claim 12, wherein the membrane separation performed as the deproteinization treatment makes use of a membrane whose molecular weight cut off is from $10^4$ to $10^6$.

14. The method for preparing a deodorized Brassicaceae plant colorant according to claim 1, wherein the Brassicaceae plant colorant is an anthocyanin colorant originating in a Brassicaceae plant.

15. The method for preparing a deodorized Brassicaceae plant colorant according to claim 9, wherein the Brassicaceae plant colorant is an anthocyanin colorant originating in a Brassicaceae plant.

* * * * *